United States Patent [19]

Bupp

[11] Patent Number: 4,800,479

[45] Date of Patent: Jan. 24, 1989

[54] HIGH FREQUENCY POWER CONVERTER HAVING COMPACT OUTPUT TRANSFORMER, RECTIFIER AND CHOKE

[75] Inventor: James H. Bupp, Hudson, Mass.

[73] Assignee: Prime Computer, Inc., Natick, Mass.

[21] Appl. No.: 175,098

[22] Filed: Mar. 31, 1988

[51] Int. Cl.[4] .......... H02M 7/06

[52] U.S. Cl. .......... 363/48; 363/126; 363/141; 363/144; 29/554

[58] Field of Search .......... 363/20, 47, 48, 126, 363/141, 144; 29/854

[56] References Cited

U.S. PATENT DOCUMENTS

| | | | |
|---|---|---|---|
| 2,564,881 | 8/1951 | Cronshey et al. | 363/126 |
| 3,906,336 | 9/1975 | De Puy | 363/144 |
| 4,184,211 | 1/1980 | Hersom et al. | 363/141 |
| 4,635,179 | 1/1987 | Carsten | 363/144 |

FOREIGN PATENT DOCUMENTS

| | | | |
|---|---|---|---|
| 97732 | 8/1979 | Japan | 363/126 |
| 155427 | 12/1979 | Japan | 363/126 |
| 22579 | 2/1983 | Japan | 363/20 |
| 106365 | 6/1985 | Japan | 363/126 |
| 838698 | 6/1981 | U.S.S.R. | 363/126 |

*Primary Examiner*—William H. Beha, Jr.

*Attorney, Agent, or Firm*—Wolf, Greenfield & Sacks

[57] ABSTRACT

A high frequency power converter circuit having a transformer comprised of a magnetic element having a through hole in combination with a pair of diodes having opposed terminals and at least one of which extends through the magnetic circuit element through hole. Bussbar conductors have the diodes and magnetic element coupled therebetween. The circuit inductance is formed by a further magnetic circuit member associated with one of the bus conductors.

24 Claims, 2 Drawing Sheets

HIGH FREQUENCY POWER CONVERTER HAVING COMPACT OUTPUT TRANSFORMER, RECTIFIER AND CHOKE

BACKGROUND OF THE INVENTION

1. Field of the Invention

The present invention relates in general to a high frequency power converter, and pertains more particularly, to a high frequency switching converter that has improved performance as well as reduced size and associated costs. The present invention is usable in particular in association with high frequency switching converters operating over 1 MHz DC/DC 2. Background Discussion The traditional high frequency power converter, also referred to as a forward-mode DC/DC converter, is comprised of such components as transformers, diodes, an output inductor and possibly other components, all as discrete elements with independent functionality. For saftey reasons it is common for the tranformer to require extra insulation and proper spacing from other components which tends to increase the overall size of the converter. Moreover, the transformer is typically mounted to a structure such as a printed circuit board and leads are required to be wired to the diodes, possibly through the etch on a printed circuit board. The diodes also require an associated heatsink. The common point of the diodes is wired to the inductor either with the use of wire or through a printed circuit board etch. For high power converters all wiring connections have to be with use of large wire or with the use of bussbars.

In the construction of high frequency power converters it is desired to have a low parasitic inductance in the transformer and output circuitry so as to provide a proper converter operation However, presently this is difficult to achieve while at the same time maintaining safety spacings between components and proper voltage breakdown ratings.

OBJECTS OF THE INVENTION

Accordingly, it is an object of the present invention to provide a high frequency power converter that is of more compact construction and yet provides improved overall performance.

Another object of the present invention is to provide an improved high frequency power converter that integrates the converter components into essentially a single mechanical structure.

A further object of the present invention is to provide an improved high frequency power converter that is of reduced cost.

Still another object of the present invention is to provide and improved high frequency power converter that is characterized by a reduced number of assembly steps.

Still a further object of the present invention is to provide an improved high frequency power converter that has improved performance by reducing the secondary leakage parasitic inductance.

Another object of the present invention is to provide an improved high frequency power converter in which the converter wiring is implemented substantially predominantly by bussbars that also function as the diode heatsink.

Still another object of the present invention is to provide an improved high frequency power switching converter that is constructed with a reduced number of overall components to thus reduce costs and size, as well as to simplify assembly.

SUMMARY OF THE INVENTION

To accomplish the forgoing and other objects, features and advantages of the invention there is now provided a high frequency power converter system that integrates the components thereof, such as the transformer, diodes and inductor into essentially a single mechanical structure, while at the same time reducing the number of components employed, reducing costs and correspondingly reducing the assembly steps and assembly time associated with the construction of the high frequency power converter. The integration of magnetics, diodes, heatsinks and bussbars, substantially eliminates wiring, reduces resistance and inductance in the output circuit of the converter, and provides a smaller and less costly package. In accordance with the invention there is provided an input transformer means that is comprised of a magnetic circuit element having a through hole. This magnetic circuit element may be comprised of a toroidal element. The system also comprises at least one unilateral conducting device having opposed terminals and disposed extending at least in part through the magnetic circuit element through hole. Bussbar means are provided comprised of a pair of bus conductors having the unilateral conducting device terminals connected therebetween. Inductance means comprised of a magnetic circuit member is associated with one of the bus conductors.

In accordance with a first embodiment of the invention described herein, the system also includes a second unilateral conducting device having opposed terminals and also connected between the bus conductors. The second unilateral conducting device in one version of the invention is disposed in the magnetic circuit element through hole. Also, the magnetic circuit member has a through hole with the one bus conductor extending therethrouqh. A capacitor is connected across the bus conductors.

In accordance with the present invention there is also disclosed herein a topology for the construction of a bridge converter empolying a pair of diodes both coupled through the hole in the magnetic circuit element. The inductance means in this version of the invention is also comprised of a magnetic circuit member substantially surrounding the magnetic circuit element.

BRIEF DESCRIPTION OF THE DRAWINGS

Numerous other object, features and advantages of the invention should now become apparent upon a reading of the following detailed description taken in conjuntion with the accompanying in which.

DETAILED DESCRIPTION

The present invention provides for the integration of magnetics, diodes, heatsinks and bussbars with the substantial elimination of any separate wiring of components. The construction of the present invention also reduces resistance and inductance in the output circuit and provides a smaller overall package. In accordance with the present invention the transformer construction usually employed in a high frequency converter circuit is substituted by a less expensive geometry, preferrably a toroidal core. The wiring associated with the transformer, diode and inductor is replaced primarily by bussbars thus reducing resistance and inductance in this secondary circuit. The inductance from the transformer to the series diode, which is the most critical inductance, is in particular reduced to an absolute minimum. The bussbar construction that supports the diodes also functions as a heatsink thus reducing components as well as reducing the cost and size of the product.

Figure 1A:
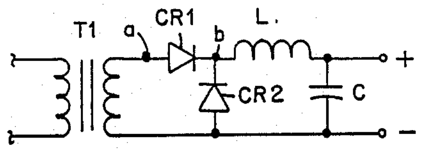
Fig.1A (PRIOR ART)
FIG. 1A is a prior art high frequency power converter circuit in separately wired discrete components.

Now, reference is made to FIG. 1A. FIG. 1A illustrates a prior art power converter circuit including a transformer T1, diodes CR1 and CR2, inductor L1 and capacitor C. In the output circuit illustrated in FIG. 1A there may be considered to be basically four separate nodes identified in FIG. IA as nodes a, b, + and −. In the particular circuit illustrated in FIG. 1A the cathodes of the diodes CR1 and CR2 are connected in common at node b.

Figure 1B:
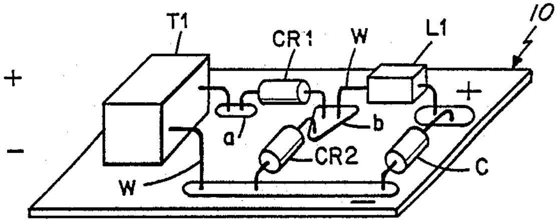
Fig.1B (PRIOR ART)
FIG. 1B is a perspective pictorial view of the circuit of FIG. 1 as mounted on a circuit board.

FIG. 1B is a pictorial view of the usual topology used in the specific circuit of FIG. IA. In this connection in FIG. 1B there is illustrated the circuit board 10 having the different components mounted thereon FIG. 1B illustrates the transformer T1 as well as the other components including the diodes CR1 and CR2, the inductor L1 and the capacitor C. Also illustrated in FIG. IB are the aforementioned defined nodes a, b, + and −. It is also noted in FIG. 1B that there are several wires W that connect the various components to these nodes. The nodes identified in FIG. 1B are made by etching upon the circuit board 10. It is noted that one of the nodes, namely the node − is in the form of an elongated conductive run.

Figure 2:
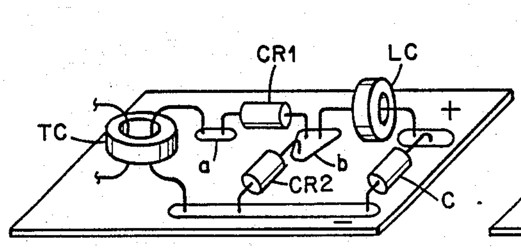
FIG. 2 is a pictorial view one modification in accordance with the present invention in which the transformer is replaced by a toroidal core.

FIG. 2 is a pictorial view illustrating a first modification in accordance with the present invention. The transformer T1 is replaced by a transformer constructed from a toroidal core TC illustrated in FIG. 2 with a single turn primary winding and a single turn secondary winding. The diodes CR1 and CR2, along with the capacitor C, remain the same in FIG. 2 as illustrated in the embodiment of FIG. 1B. However, in the modification of FIG. 2 the output inductor L1 is also constructed as a single turn through a toroidal core LC.

Figure 3:
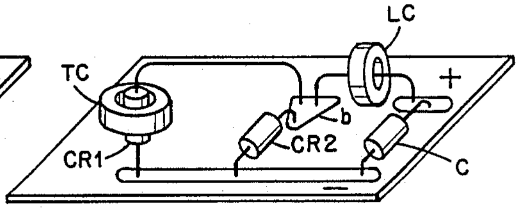
FIG. 3 is a pictorial view of a further modification in accordance with the present invention in which the diode is disposed within the toroidal core.

The pictorial view of FIG. 3 illustrates a further modification in accordance with the present invention. It is noted that the diode CR1 is now shifted so as to be within the center hole of the toroidal core TC. From a circuit standpoint the configuration is not any different in FIG. 3 than in FIG. 2 but improved performance results. Also, the coupling of the diode through the toroidal core is instrumental in minimizing the size of the overall circuit.

Figure 4A:
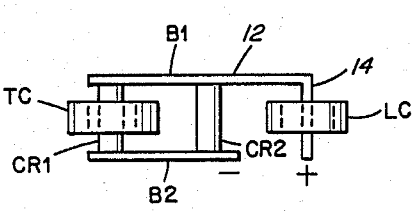
FIG. 4A illustrates a preferred embodiment of the present invention in a side elevation view.
Figure 4B:
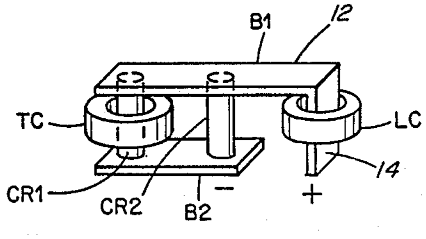
FIG. 4B is a perspective view of the embodiment of FIG. 4A illustrating the diodes coupling in parallel with the bussbar conductors.

Reference is now made to FIGS. 4A and 4B for a preferred embodiment of the present invention in which, in place of a circuit board with etchings thereon, there instead essentially is an elimination of the circuit board and the provision for opositely disposed bussbars B1 and B2. It is noted that, by doing this, the node essentially disappears. With the proper selection of the cores TC and LC and selection of diodes CR1 and CR2, a simple mechanical structure results.

In FIGS. 4A and 4B it is noted that the bussbar conductor B2 is substantially flat while the bussbar conductor B1 is of L-shape including legs 12 and 14. The diodes CR1 and CR2 are coupled between the leg 12 of bussbar B1 and bussbar B2. The toroidal core LC is coupled about the leg 14. In FIGS. 4A and 4B the capacitor C is not illustrated but would be coupled between the nodes + and −. The diodes CR1 and CR2 have opposite end terminals that could be soldered or attached by other appropriate electrically conductive means to the respective bussbars B1 and B2. The toroidal cores TC and LC may be supported, such as by appropriate adhesives such as an epoxy adhesive. The toroidal core TC is secured with the diode CR1. The toroidal core LC is secured with the leg 14.

Figure 5A:
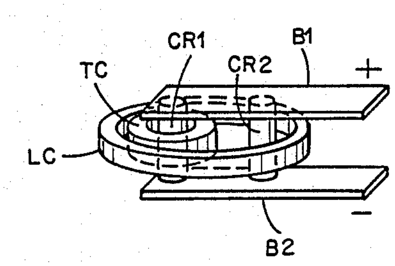
FIG. 5A is a perspective view of an alternate embodiment of the invention.

FIG. 5A illustrates a further embodiment of the present invention in which the output inductor is essentially drawn along the conductor until it rests over the torridal core TC and the diodes CR1 and CR2. It is interesting to note that in this construction the node b also essentially disappears and there remains the pictorially illustrated bussbars B1 and B2.

It is noted that in the embodiment of FIG. 5A the overall circuit is very compact. The toroidal core LC, of course, is of larger diameter than the toroidal core TC. These respective toroidal cores as well as the diodes CR1 and CR2 are sized so as to provide a proper interrelationship and an overall preferred size construction.

The resulting magnetic circuit of FIG. 5A functions as a power converter. It displays some characteristics of the forward converter from which it was derived. However, the primary of the transformer is clamped by the output voltage as a function of the turns ration.

Figure 5B:
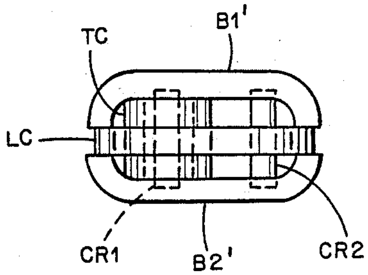
FIG. 5B illustrates still a further embodiment of the present invention in which the bussbar construction is also used for electrical shielding.

FIG. 5B is a side elevation view partially cut away of an alternate embodiment of the invention similar to that illustrated in FIG. 5A but furthermore illustrating the bus conductors B1′ and B2′ constructed of a cupped construction, as illustrated. The cupped construction provides increased shielding for the circuit. It is noted in FIG. 5B that the cupped bussbars B1 and B2 extend substantial about the circuit components.

The bussbars of the present invention provide a multipurpose use. Their primary use is one of electrical conductivity between the components. However, in addition they can provide the shielding as illustrated in FIG. 5B and furthermore form: a heatsink, particularly for the diodes CR1 and CR2. It is noted that the bussbars B1 and B2, such as illustrated in FIG. 4B, are of relatively substantial size so as to provide a relatively large heatsink surface. In this connection the diodes CR1 and CR2 are preferrably coupled so that the very ends thereof are in good intimate contact with the bussbars B1 and B2 to provide good heat transfer to the bussbars.

Figure 6A:
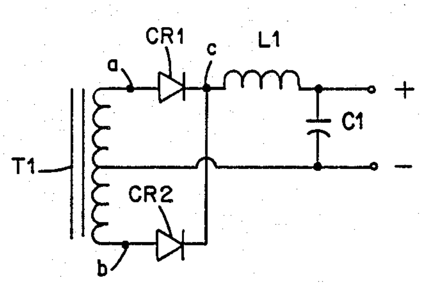
Fig.6A (PRIOR ART)
FIG. 6A is a prior art circuit diagram of a bridge converter.

Reference is now made to FIG. 6A for an illustration of a second prior art converter circuit. FIG. 6A shows a different construction than that illustrated if FIG. 1A. In FIG. 6A there is disclosed a bridge converter including a transformer T1 having a secondary winding with a center tap coupling to the node −. FIG. 6A also shows the diodes CR1 and CR2, the inductor L1 and the capacitor Cl. There are also shown in FIG. 6A nodes a, b, c, + and −. In FIG. 6A it is noted that the annodes of the diodes of CR1 and CR2 are tied in common and to the node c.

Figure 6B:
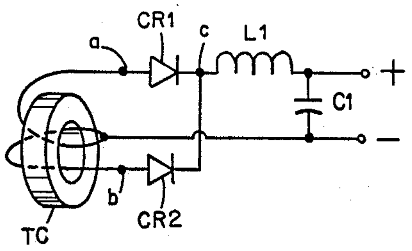
FIG. 6B illustrates a modification to the circuit of FIG. 6A in accordance with the present invention and employing a toroidal core.
Figure 6C:
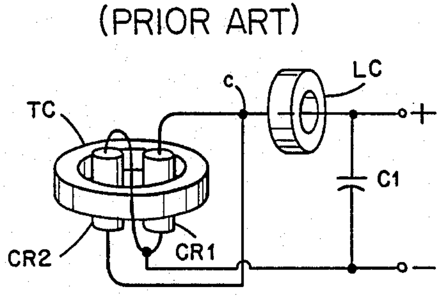
FIG. 6C is a diagramatic view of a further modification of the present invention in which the pair of diodes are disposed within the toroidal core.

FIG. 6B illustrates a modification in accordance with the present invention in which there is provided the toroidal core TC in place of the transformer T1. FIG. 6C illustrates both of the diodes CR1 and CR2 now disposed so that both of them extend through a hole in the toroidal core TC. FIGS. 6B and 6C also illustrate the corresponding wiring that is provided in association with the diodes CR1 and CR2. Also noted in FIG. 6C is the substitution of the toroidal core LC for the inductor L1 illustrated in FIGS. 6A and 6B.

Figure 6D:
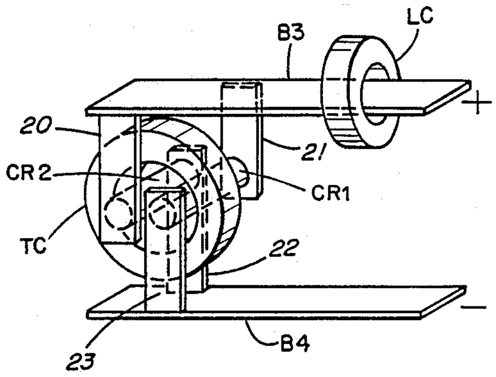
FIG. 6D is side elevation view of the embodiment of FIG. 6C employing bussbars.

Reference is now made to FIG. 6D for a final form of the construction for the bridge converter including, in place of the individual wires, the bussbars B3 and B4. FIG. 6D illustrates the torridal core LC associated with the bussbar B3. The bussbars B3 and B4 essentially sandwich the other components therebetween including the toroidal core TC and diodes CR1 and CR2.

The bussbar B3 has associated therewith bar conductors 20 and 21. Similarly, the bussbar B4 has associate therewith bus conductors 22 and 23. The pairs of conductors associated with each buss are spaced apart as illustrated in FIG. 6D. The bus conductors 20 and 22 are coupled to opposite sides of the diode CR2. The bus conductors 21 and 23 couple to opposite sides of the diode CR1.

Figure 7:
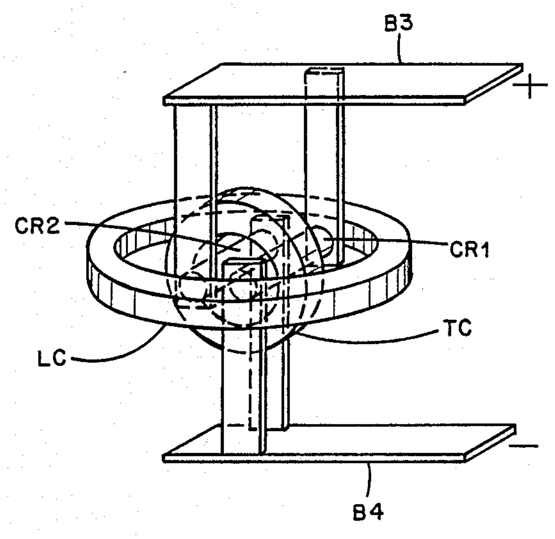
FIG. 7 is a perspective view of an alternate embodiment of the invention analogous to the embodiment of FIG. 5A.

Reference is now also made to FIG. 7 for an illustration of still a further embodiment of the present invention in which the inductor L1, as represented by the toroidal core LC is now slid along the bussbar B3 and into a position essentially surrounding the toroidal core TC. FIG. 7 also illustrates the position of the diodes CR1 and CR2 and the respective bussbars B3 and B4.

Thus, in summary, in accordance with the present invention there has now been described herein an improved high frequency power converter system employing an improved transformer construction preferrably of toroidal core type with the typical circuit board and associated wiring replaced by bussbars that are instrumental in reducing resistance and inductance in the transformer secondary circuit. There is in particular a substantial reduction in inductance from the transformer to the series diodes. In the preferred embodiment of the invention, such as illustrated in FIGS. 4A and 4B a diode package is sandwiched between two bussbars with the bussbars also functioning as heatsinks for the diodes thus not requiring the use of separate heatsink devices associated with each diode. The inductor of the circuit is formed from a magnetic element along with one or both of the bussbars as a single turn inductor.

Having now described a limited number of embodiments of the present invention, it should be apparent to those skilled in the art that numerous other embodiments and modifications thereof are contemplated as falling withing the scope of the present as defined by the appended claims. For example, in an alternate embodiment of the invention the magnetic element may be of a different configuration provided, however, with a center hole or slot. For example magnetic elements of UI, CC, EE or EC type may be employed. Also, in still another embodiment of the invention the bridge circuit may comprise four diodes that may all be disposed within the magnetic core element.

What is claimed is:

1. A high frequency power converter system comprising;

an input transformer means comprised of a magnetic circuit element having a through hole, at least one unilateral conducting device having opposed terminals and disposed extending at least in part through the magnetic circuit element through hole, bussbar means comprised of a pair of bus conductors having said unitateral conducting device terminals connected therebetween, and inductance means comprised of a magnetic circuit member associated with one of said bus conductors.

2. A high frequency power converter system as set forth in claim 1 including a second unilateral conducting device having opposed terminals and also connected between said bus conductors.

3. A high frequency power converter system as set forth in claim 2 wherein said second unilateral conducting device is also disposed in said magnetic circuit element through hole.

4. A high frequency power converter system as set forth in claim 2 wherein said magnetic circuit member also has a through hole with said one bus conductor extending therethrough.

5. A high frequency power converter system as set forth in claim 1 including a capacitor connected across the bus conductors.

6. A high frequency power converter system as set forth in claim 1 wherein said magnetic circuit member has a through hole for receiving therein said magnetic circuit element and unilateral conducting device.

7. A high frequency power converter system as set forth in claim 6 including a second unilateral conducting device having opposed terminals connected between said bus conductors and also disposed extending through the magnetic circuit member through hole.

8. A high frequency power converter system as set forth in claim 1 wherein said unilateral conducting device comprises a diode.

9. A high frequency power converter system as set forth in claim 8 wherein said bus conductors are in heat-transfer supporting relationship relative to said diode so that said bus conductors function as a heatsink.

10. A high frequency power converter system as set forth in claim 1 wherein said pair of bus conductors includes one conductor having diferently directed legs one of which is for support of said magnetic circuit member.

11. A high frequency power converter system comprising;

a first magnetic circuit element having a through hole, a second magnetic circuit element having a through hole, at least one diode having opposed terminals and disposed extending at least in part through said first magnetic element through hole, bussbar means comprised of a pair of bus conductors having said diode terminals connected therebetween, said second magnetic circuit member associated with one of said bus conductors.

12. A high frequency power converter system as set forth in claim 11 including a second diode having opposed terminals and also connected between said bus conductors.

13. A high frequency power converter system as set forth in claim 12 wherein said second diode is also disposed in the first magnetic circiut element through hole.

14. A high frequency power converter system as set forth in claim 12 wherein said second circuit element also has a through hole with said one bus conductor extending therethrough.

15. A high frequency power converter system as set forth in claim 11 including a capacitor connected across said bus conductors and wherein said magnetic circuit element comprises a magnetic toroid element.

16. A high frequency power converter system as set forth in claim 11 wherein said second magnetic circuit element has a through hole for receiving therein said first magnetic circuit element and diode.

17. A high frequency power converter system as set forth in claim 16 including a second diode having opposed terminals connected between said bus conductors and also disposed extending through the through hole in said second magnetic circuit element.

18. A high frequency power converter system as set forth in claim 11 wherein said bus conductors define a heatsink for said diode.

19. A high frequency power converter system as set forth in claim 18 wherein said bus conductors extend to substantially enclose the magnetic circuit elements to form an electrical shield.

20. A method of fabricating a high frequency power converter comprising the steps of, providing an input transformer means in the form of a magnetic circuit element having a through hole, providing at least one unilateral conducting device having opposed terminals, disposing the unilateral conducting device at least in part through the magnetic circuit element through hole, providing a pair of bus conductors, connecting the unilaterial conducting device between the bus conductors, providing an inductance means in the form of a magnetic circuit member, and disposing said magnetic circuit member in association with one of the bus conductors.

21. A method as set forth in claim 20 including providing a second unilaterial conducting device having opposed terminals and connecting the second unilaterial conducting device between the bus conductors.

22. A method as set forth in claim 21 wherein the second unilaterial conducting device is also disposed in the magnetic circuit element through hole.

23. A method as set forth in claim 21 wherein said magnetic circuit member also has a through hole with said one bus conductor extending therethrouqh.

24. A method as set forth in claim 20 including providing a capacitor connected across the bus conductors.

* * * * *